(12) United States Patent
Clawson

(10) Patent No.: US 12,037,228 B1
(45) Date of Patent: Jul. 16, 2024

(54) FAIRLEAD

(71) Applicant: DRVN INDUSTRIES, LLC, Burley, ID (US)

(72) Inventor: Alan R. Clawson, Rupert, ID (US)

(73) Assignee: DRVN INDUSTRIES, LLC, Burley, ID (US)

( * ) Notice: Subject to any disclaimer, the term of this patent is extended or adjusted under 35 U.S.C. 154(b) by 0 days.

(21) Appl. No.: 17/525,456

(22) Filed: Nov. 12, 2021

(51) Int. Cl.
*B66D 1/36* (2006.01)
*B60R 11/00* (2006.01)

(52) U.S. Cl.
CPC ............... *B66D 1/36* (2013.01); *B60R 11/00* (2013.01); *B60R 2011/004* (2013.01); *B66D 2700/0191* (2013.01)

(58) Field of Classification Search
CPC .. B63B 21/10; B66D 1/00; B66D 1/28; B66D 1/30; B66D 1/36; B66D 2700/0191; B60R 11/00; B60R 2011/004; F16G 11/02; F16G 11/146; F16B 45/00

USPC ......................................................... 254/389
See application file for complete search history.

(56) References Cited

U.S. PATENT DOCUMENTS

| D807,732 S | * | 1/2018 | Fretz | .............................. D8/356 |
|---|---|---|---|---|
| 10,407,286 B1 | * | 9/2019 | Bellis, Jr. | ................. B66D 1/00 |
| 10,519,012 B1 | * | 12/2019 | Hare | ........................ B66D 1/36 |
| 10,562,743 B2 | * | 2/2020 | Fretz | ....................... B63B 21/10 |
| 2019/0127190 A1 | * | 5/2019 | Fretz | ......................... B66D 1/60 |

* cited by examiner

*Primary Examiner* — Michael R Mansen
*Assistant Examiner* — Henrix Soto
(74) *Attorney, Agent, or Firm* — Buckingham, Doolittle & Burroughs, LLC.

(57) ABSTRACT

A fairlead for use with a winch line includes a guide aperture, one or more recessed cavities and one or more anchors. Thus, the guide aperture is configured to receive therethrough the free end of the winch line that includes a loop. The various recesses of the fairlead allow the winch line and the looped end to remain disposed therein so that they do not protrude away from the fairlead and are protected from environmental hazards. In addition, the looped end of the winch line is positioned so that that one of the anchors of the fairlead is positioned therethrough.

19 Claims, 11 Drawing Sheets

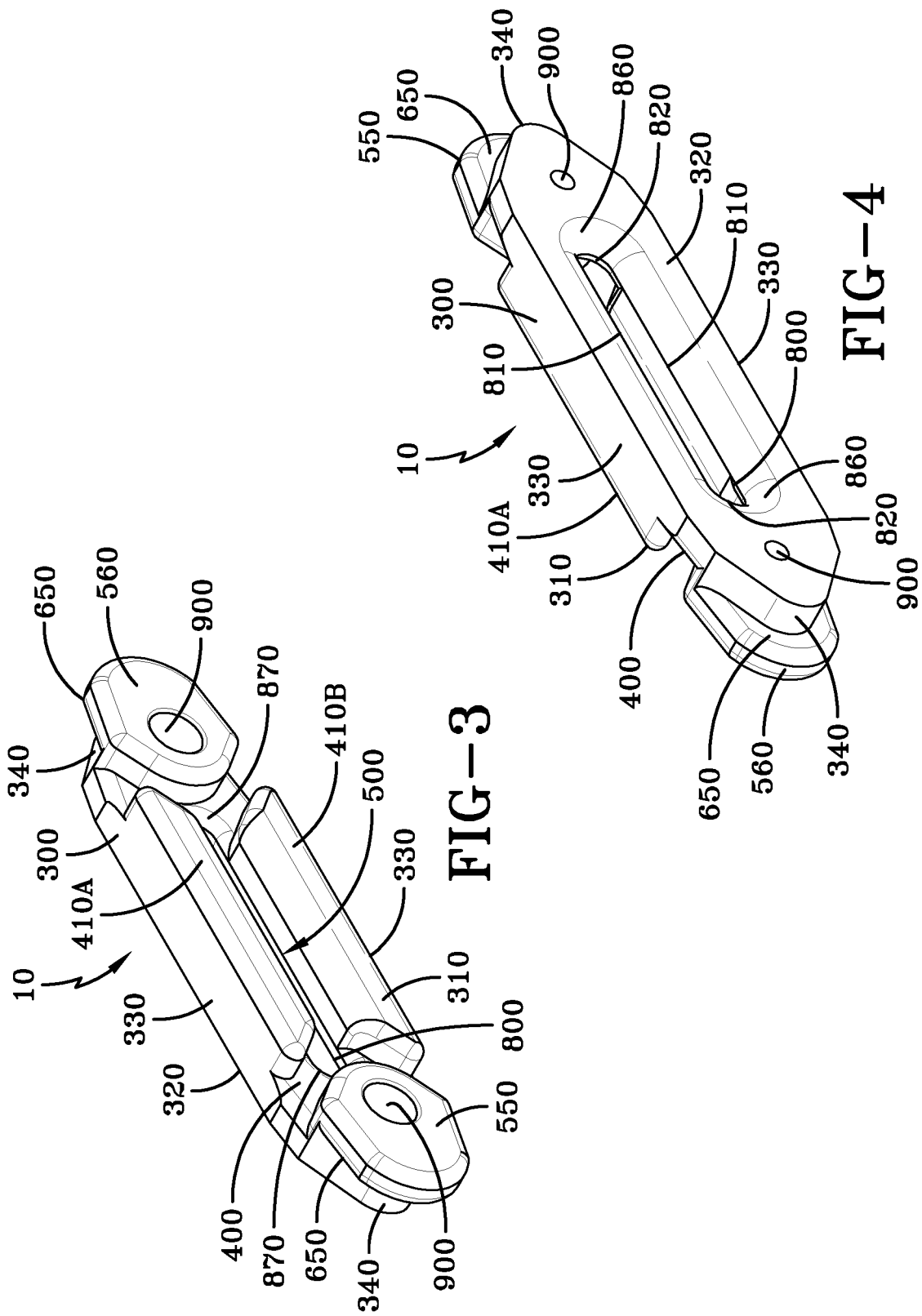

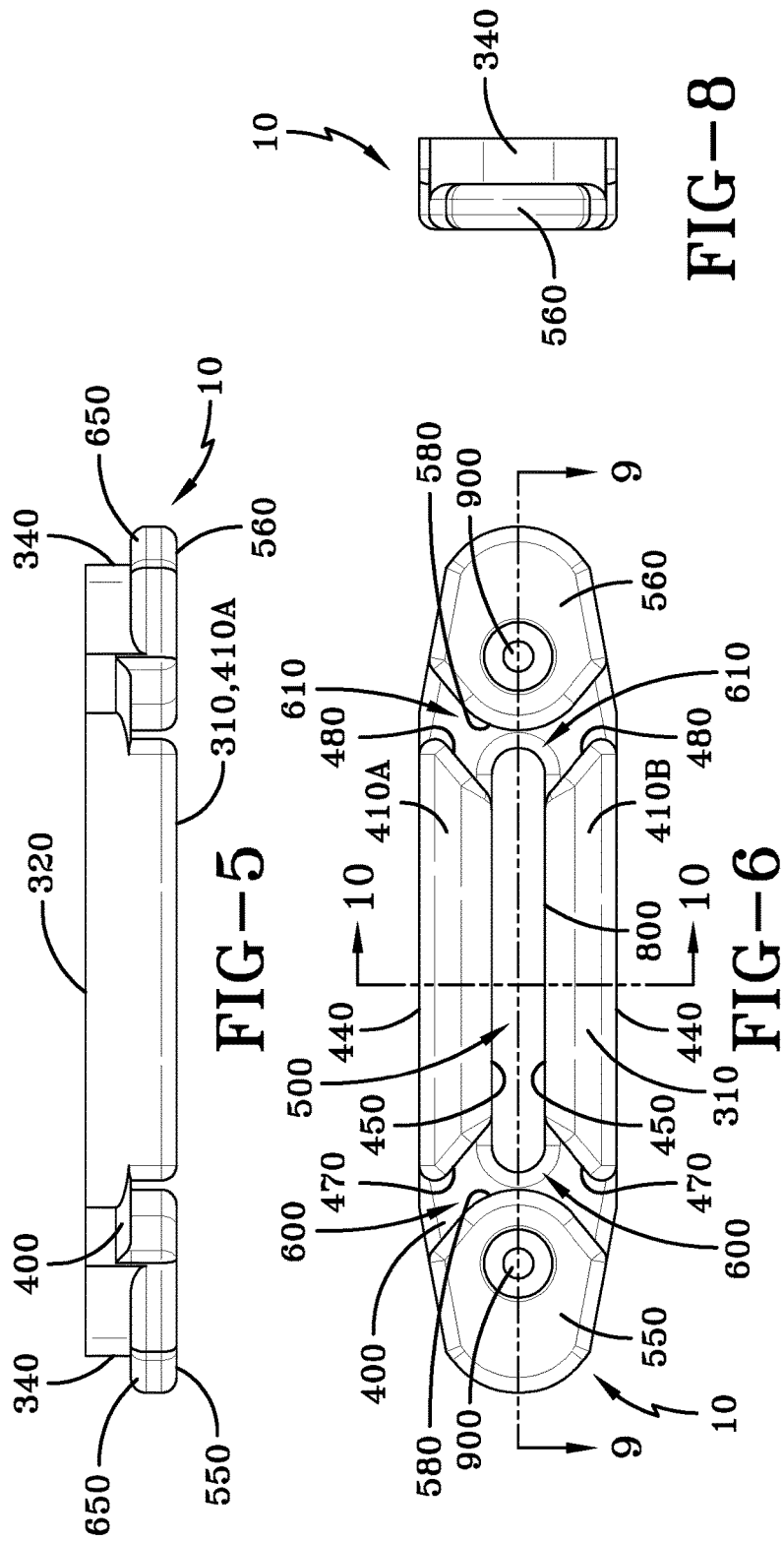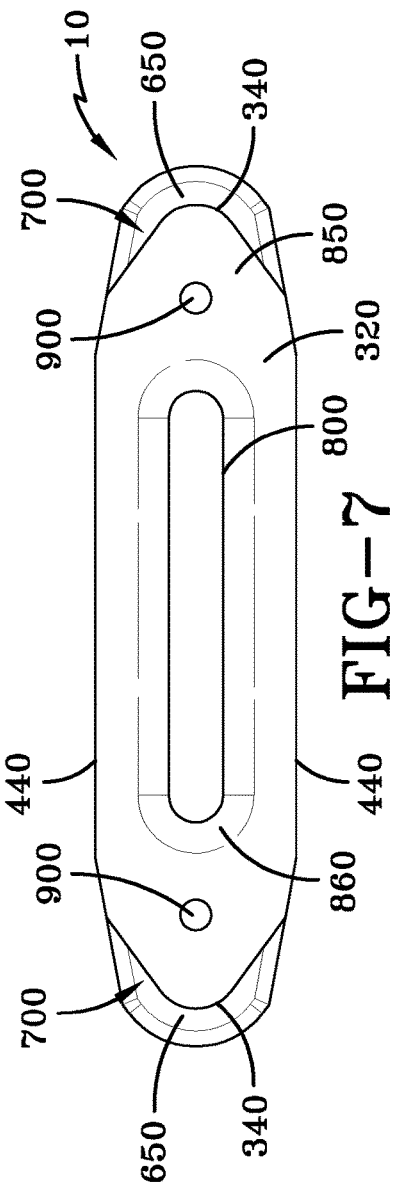

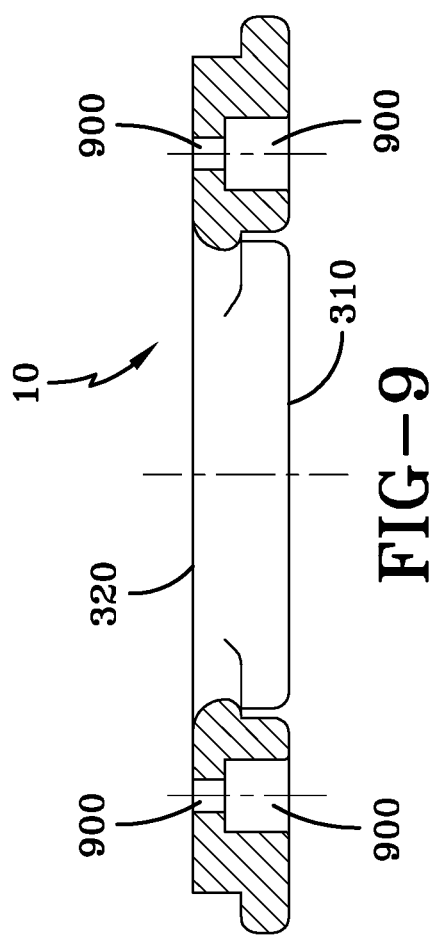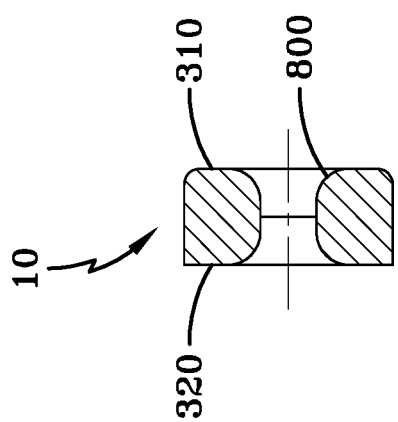

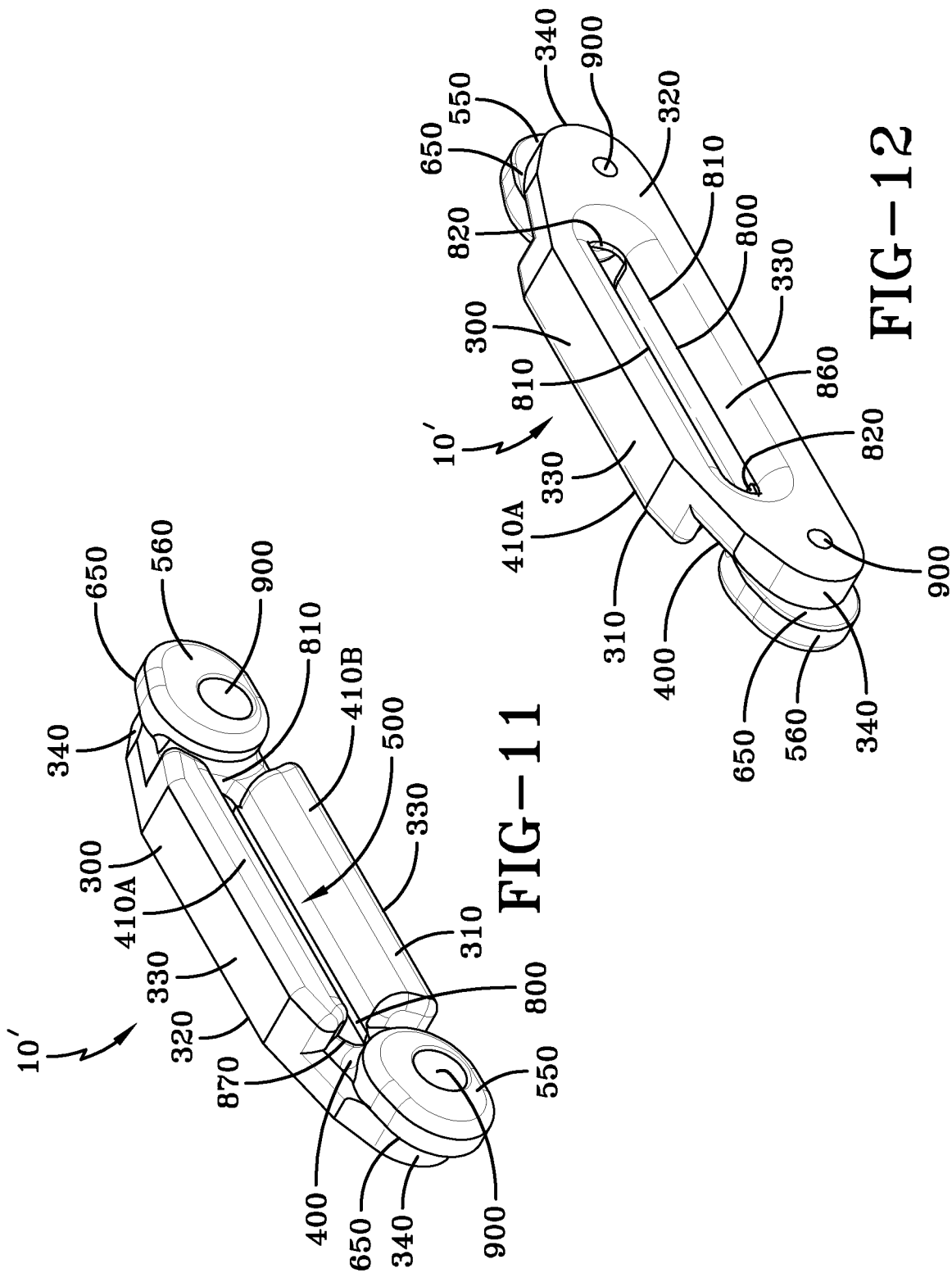

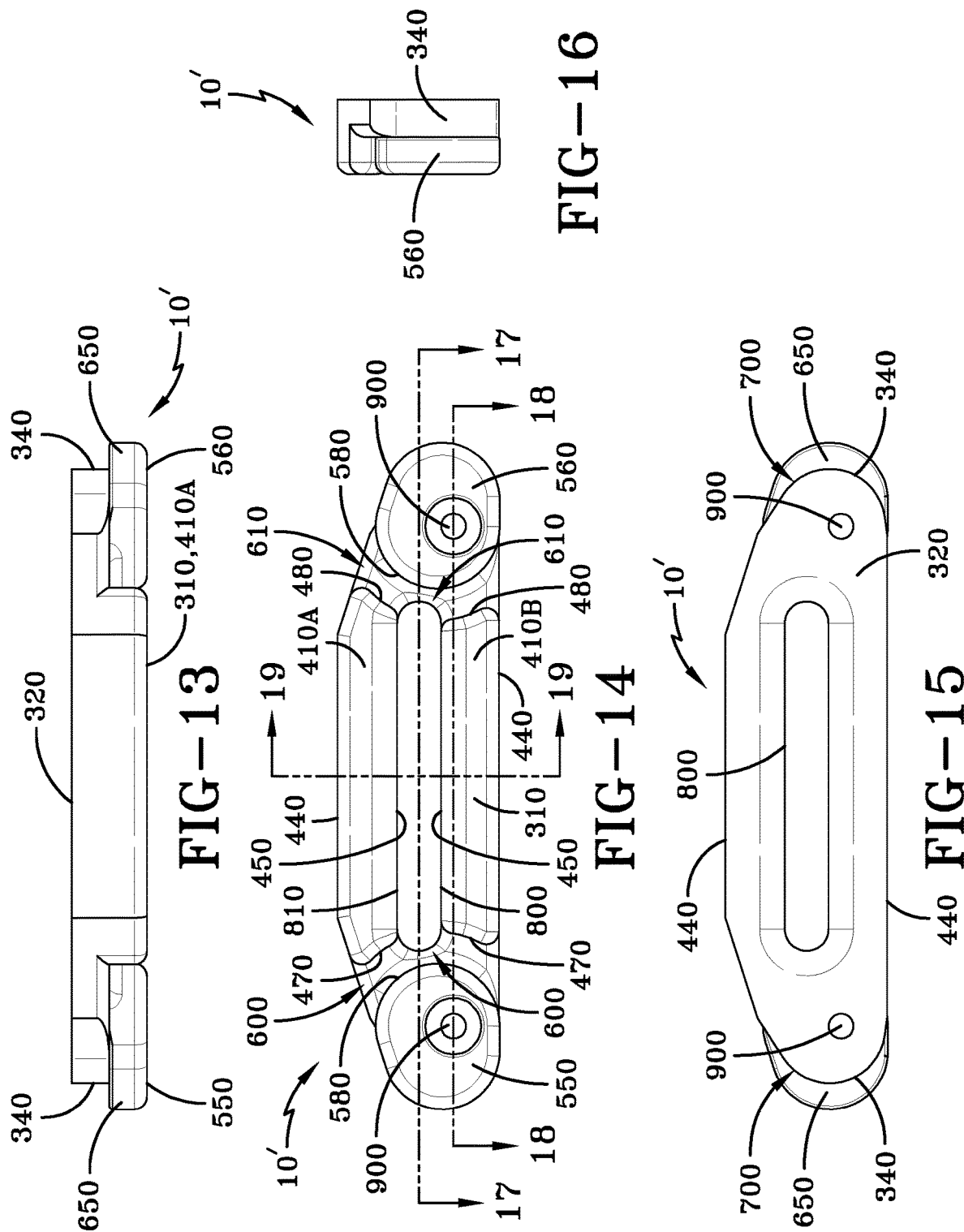

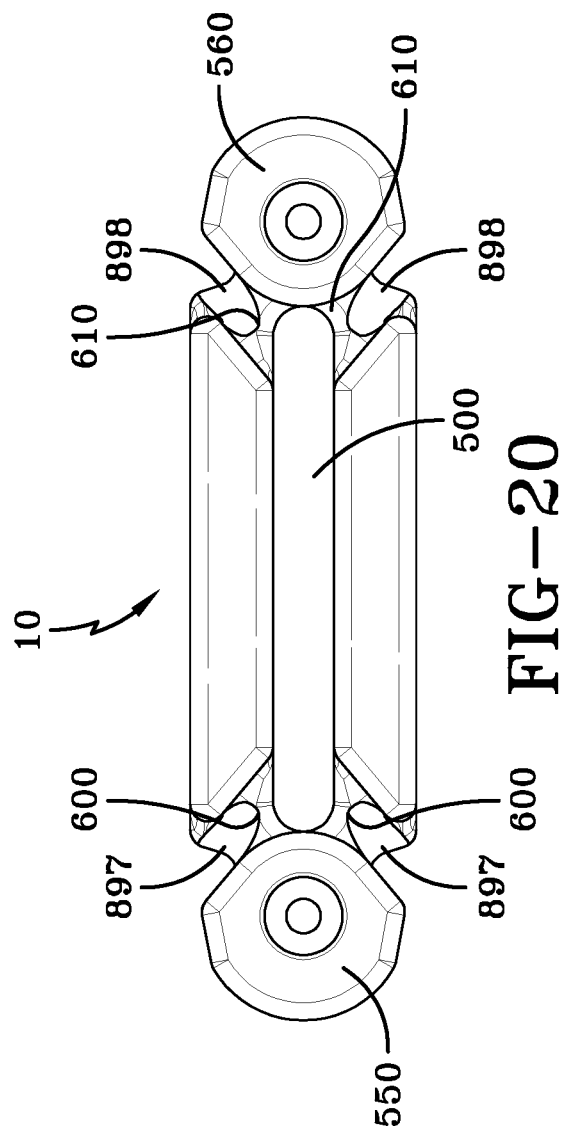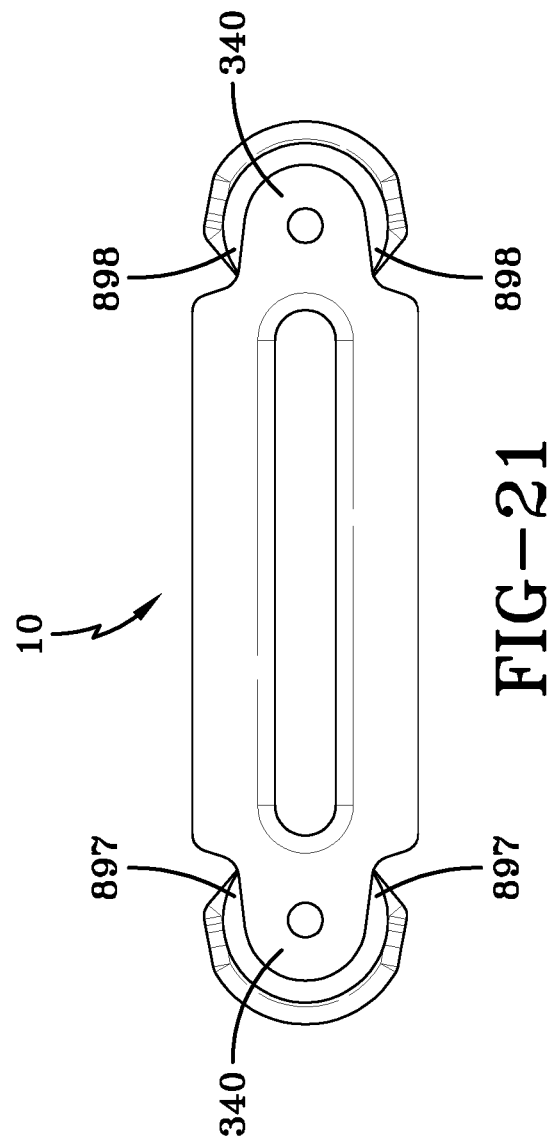

FAIRLEAD

TECHNICAL FIELD

The various embodiments disclosed herein relate to fairleads. Particularly, the various embodiments disclosed herein relate to fixed fairleads. More particularly, the various embodiments disclosed herein relate to a fixed fairlead having recessed cavities and anchors for retaining a terminal looped end of a winch line to the fairlead.

BACKGROUND

A fairlead is a component that is used to guide the movement of a line, such as a cable, rope or chain, while preventing the line from becoming caught, frayed or otherwise damaged as it moves relative to the fairlead. For example, the fairlead may include a metallic body having a guide aperture that is disposed therethrough. The guide aperture allows the line passing therethrough to be pulled in a direction that is not straight away from the line. In some designs, the area near or proximate to the guide aperture is curved or beveled to facilitate the smooth movement of the line thereover.

Fairleads are commonly used on vehicles, particularly off-road vehicles, such as 4-wheel drive trucks, JEEP®, all-terrain vehicles (ATVs), utility terrain vehicles (UTV) and the like, where they are mounted to a bumper or other frame member of the vehicle. In this context, the line that is received through the guide aperture of the fairlead is referred to as a "winch line", which is rotatably wound/unwound on a motorized spool provided by a winch that is also mounted to the vehicle. That is, the winch provides a motorized drive spool that controls the movement of the winch line through the guide aperture of the fairlead. The free end of the winch line is typically terminated by a loop so as to form a "looped end", which allows it to be attached to a variety of accessories, including, but not limited to, a hook, a shackle or other connection/attachment component, while the other end of the winch line is attached to the drive spool of the winch.

Thus, the winch imparts an external pulling force to the vehicle, which is desirable when the vehicle is stuck or is attempting to traverse a steep incline or grade. Accordingly, to realize this external pulling force, the free or looped end of the winch line, which may also include a hook or shackle attached thereto, is attached to a stationary or fixed anchoring member, such as a tree, boulder or other suitably fixed structure. Once the looped end of the winch line is suitably anchored, the winch is actuated so that the winch line is pulled and drawn in and collected upon to the drive spool, thereby causing the vehicle to be pulled and moved in a direction that follows that defined by the winch line. During this process, the winch line passes through the guide aperture of the fairlead. As such, as the winch line is drawn, such as at an angle, the winch line is permitted to slide over the surface of the fairlead that is proximate or near to the guide aperture of the fairlead. As a result, the fairlead serves to guide the winch line as it moves, while simultaneously preventing the winch line from fraying and other damage, as well as from becoming stuck or caught as it moves.

Alternatively, when the vehicle is being driven and the winch line is not in use, the hook or shackle that is attached to the free or looped end of the winch line is often used as a means to secure the free looped end of the winch line in place. That is, the hook or shackle that is attached to the free or looped end of the winch line is wound up by the winch so that the hook or shackle is pulled into the guide aperture of the fairlead by the force of the winch. This technique is used to prevent the free or looped end of the winch line from flailing about, getting dragged and damaged on the ground or becoming dangerously intertwined with a wheel, drive shaft or other rotating member of the vehicle.

Unfortunately, because the hook or the shackle of the winch line is drawn into the guide aperture of the fairlead under the high torque force of the winch, the hook or shackle often becomes wedged into the guide aperture. That is, because the winch pulls the hook or shackle of the winch line into the guide aperture with high force, the hook or shackle often becomes jammed therein. As a result, it is substantially difficult, and in some cases impossible, for an individual to free the hook or shackle from the fairlead on their own. In some cases, an individual is required to apply an external force, such as hammering the hook or shackle free from the guide aperture of the fairlead, which can result in damage to the fairlead, as well as to the hook or shackle.

Alternatively, to prevent the jamming of the hook or shackle in the guide aperture of the fairlead when the winch line is not in use, some winch operators elect to utilize a safety thimble that is attached to the loop end that terminates the free end of the winch line. The safety thimble embodies a metal or plastic structure that retains the free loop end of the winch line therein. In addition, the thimble includes a base that is dimensioned to be larger than the opening of the guide aperture of the fairlead, and as such, prevents the free or looped end of the winch line (as well as any hook or shackle attached to the looped end) from being pulled into and wedged in the guide aperture of the fairlead. In other words, due to its size, the thimble cannot be pulled into the guide aperture, thereby preventing the hook and shackle attached to the looped end of the winch line from being pulled into and getting jammed into the guide aperture of the fairlead.

While the techniques described above utilizing the hook, shackle and thimble to secure the free looped end of the winch line when the winch line is not in use prevents the hook and shackle that are attached to the looped end of the winch line from becoming jammed into the guide aperture of the fairlead, they suffer many drawbacks. For example, due to the size and nature of the thimble, it tends to project or protrude outward from the fairlead and away from the bumper of the vehicle. Because of this, the use of the thimble reduces the approach angle of the vehicle or the maximum angle of inclination that the vehicle can drive up onto when the vehicle is in a horizontal orientation without the front bumper (including the fairlead and thimble) contacting or dragging the ground. The wedging of the hook and shackle into the guide aperture as a means to secure the free or looped end of the winch line also reduces the approach angle of the vehicle, as the hook and shackle also protrudes outward from the fairlead, and away from the bumper of the vehicle.

Because it is highly desirable to have a large approach angle for a vehicle, especially off-road vehicles, the use of the hook, shackle and thimble are not desirable solutions for securing and preventing damage to the free or looped end of the winch line when the winch is not being used. Furthermore, the damage that is often caused to the fairlead when the hook or shackle is jammed into the guide aperture does not make it a desirable approach for securing the free or looped end of the winch line to the fairlead.

Therefore, there is a need for a fairlead that provides one or more recessed channels to store and protect the free end of a winch line from becoming frayed or otherwise damaged when the winch line is not in use. In addition, there is a need for a fairlead that protects the free end of a winch line without reducing the approach angle of a vehicle. Furthermore, there is a need for a fairlead that provides one or more anchors that is received through the free looped end of a winch line, allowing the winch line to be tightened and secured against the anchor. Still yet, there is a need for a fairlead that obviates the use a thimble, a hook or a shackle to protect the free end of a winch line from becoming frayed or otherwise damaged when the winch line is not in use.

SUMMARY

In light of the foregoing, it is an aspect of the present invention to provide a fairlead that includes comprising a fairlead for a vehicle carrying a winch line having a looped end, the fairlead comprising a body having a first surface and a second surface, said second surface adapted to be positioned proximate to the vehicle; a guide aperture disposed through said body adapted to receive the winch line therethrough; at least one mounting aperture disposed through said body; and a recessed cavity disposed in said first surface of said body and in communication with at least a portion of said guide aperture, said cavity adapted to receive at least a portion of the winch line therein.

BRIEF DESCRIPTION OF DRAWINGS

These and other features and advantages of the various embodiments disclosed herein will become better understood with regard to the following description, appended claims and accompanying drawings, wherein:

FIG. 3 is a front perspective view of the fairlead in accordance with the concepts of the various embodiments disclosed herein;

FIG. 4 is a rear perspective view of the fairlead in accordance with the concepts of the various embodiments disclosed herein;

FIG. 5 is a top plan view of the fairlead in accordance with the concepts of the various embodiments disclosed herein;

FIG. 6 is a front elevational view of the fairlead in accordance with the concepts of the various embodiments disclosed herein;

FIG. 7 is a rear elevational view of the fairlead in accordance with the concepts of the various embodiments disclosed herein;

FIG. 8 is a side elevational view of the fairlead in accordance with the concepts of the various embodiments disclosed herein;

FIG. 9 is a cross-sectional view of the fairlead in accordance with the concepts of the various embodiments disclosed herein;

FIG. 10 is a cross-sectional view of the fairlead in accordance with the concepts of the various embodiments disclosed herein;

FIG. 11 is a front perspective view of an alternative fairlead in accordance with the concepts of the various embodiments disclosed herein;

FIG. 12 is a rear perspective view of the alternative fairlead in accordance with the concepts of the various embodiments disclosed herein;

FIG. 13 is a top plan view of the alternative fairlead in accordance with the concepts of the various embodiments disclosed herein;

FIG. 14 is a front elevational view of the alternative fairlead in accordance with the concepts of the various embodiments disclosed herein;

FIG. 15 is a rear elevational view of the alternative fairlead in accordance with the concepts of the various embodiments disclosed herein;

FIG. 16 is a side elevational view of the alternative fairlead in accordance with the concepts of the various embodiments disclosed herein;

FIG. 20 is a view of yet another alternative fairlead in accordance with the concepts of the various embodiments disclosed herein;

FIG. 21 is another view of the alternative fairlead in accordance with the concepts of the various embodiments disclosed herein.

DETAILED DESCRIPTION

Figure 1:
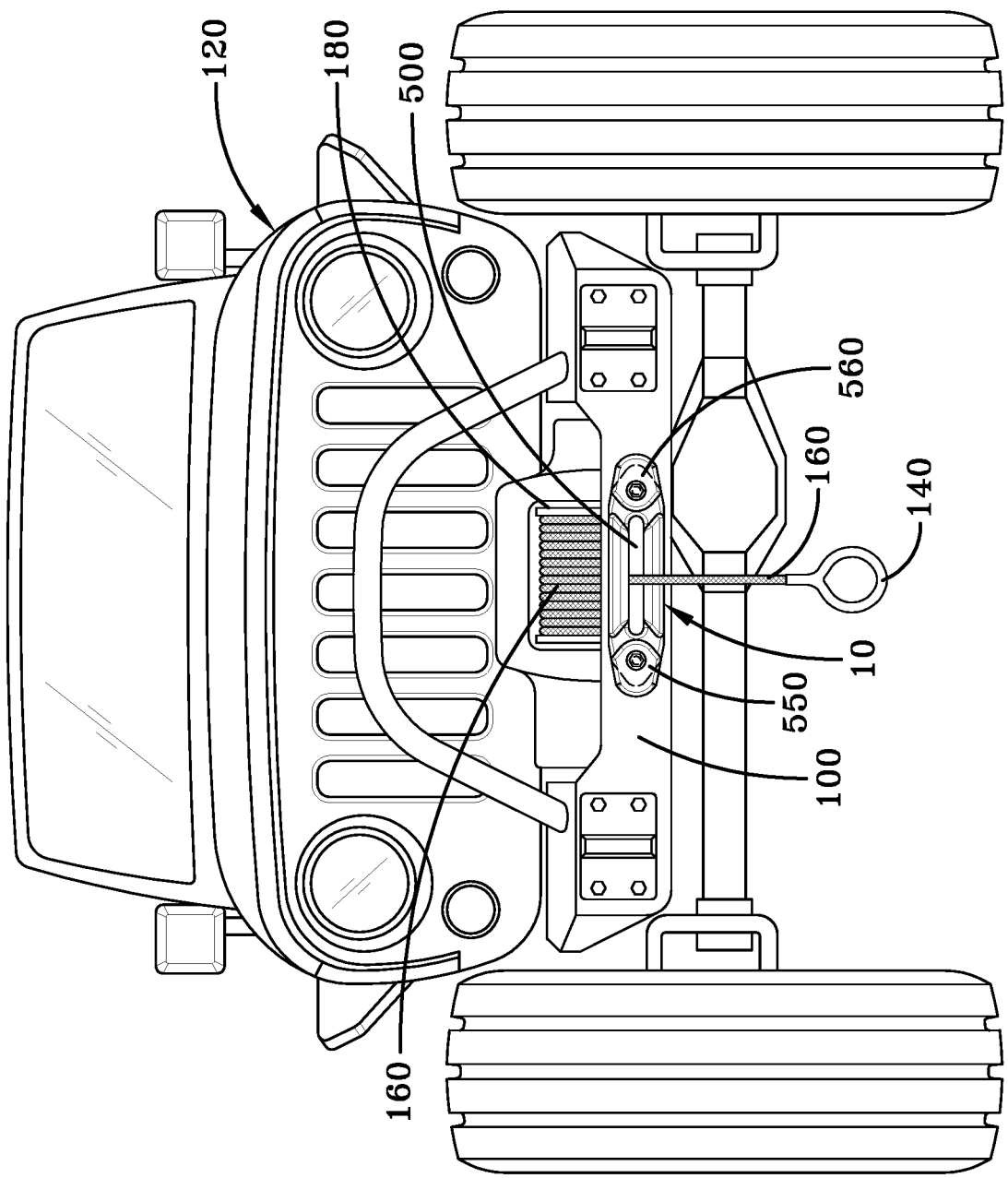
FIG. 1 is an elevational view of a fairlead attached to a vehicle with a winch line extended through a guide aperture disposed therein in accordance with the concepts of the various embodiments disclosed herein.
Figure 2:
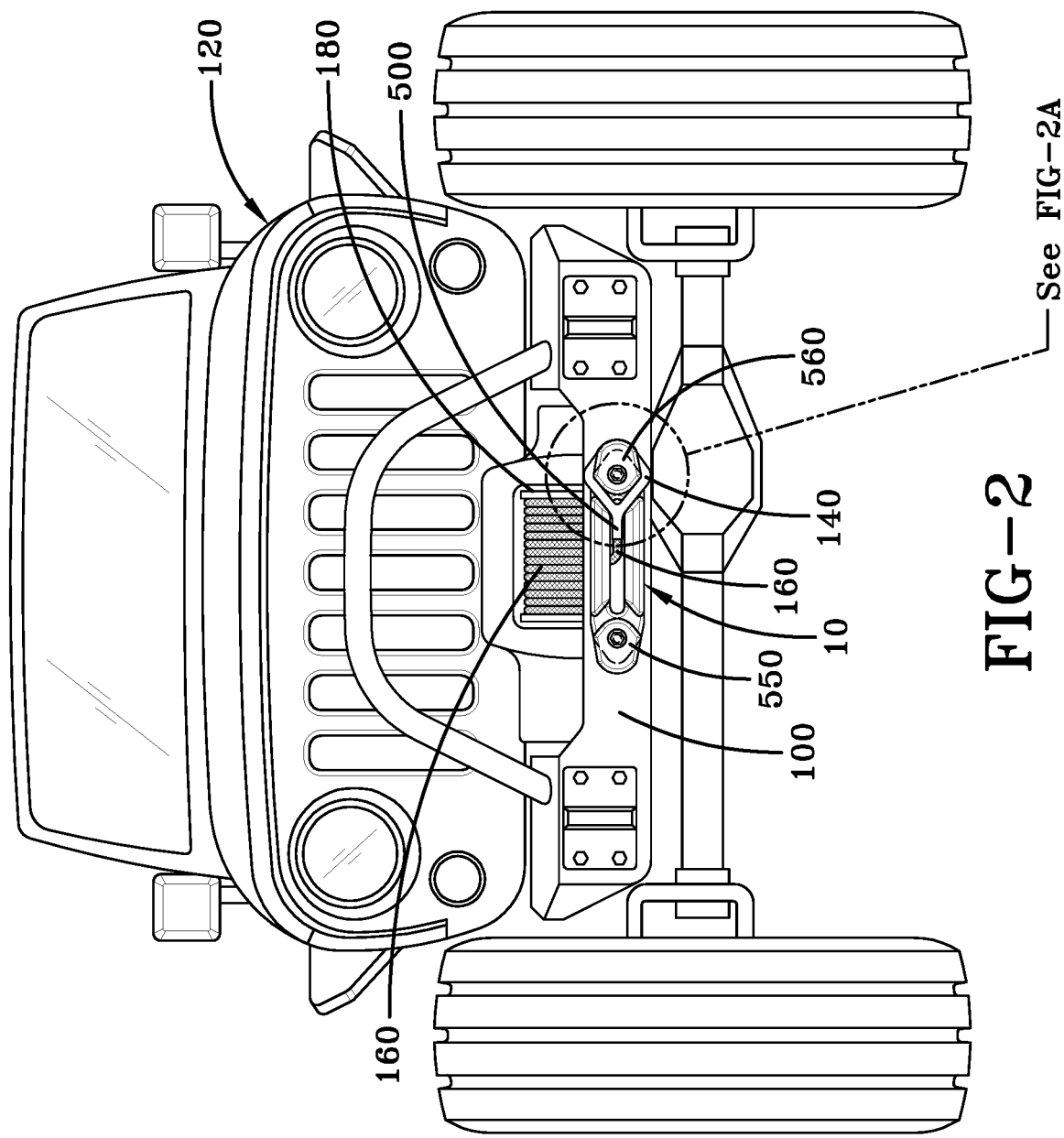
FIG. 2 is an elevational view of a fairlead attached to a vehicle with a looped end of the winch line secured to an anchor in accordance with the concepts of the various embodiments disclosed herein.
Figure 2A:
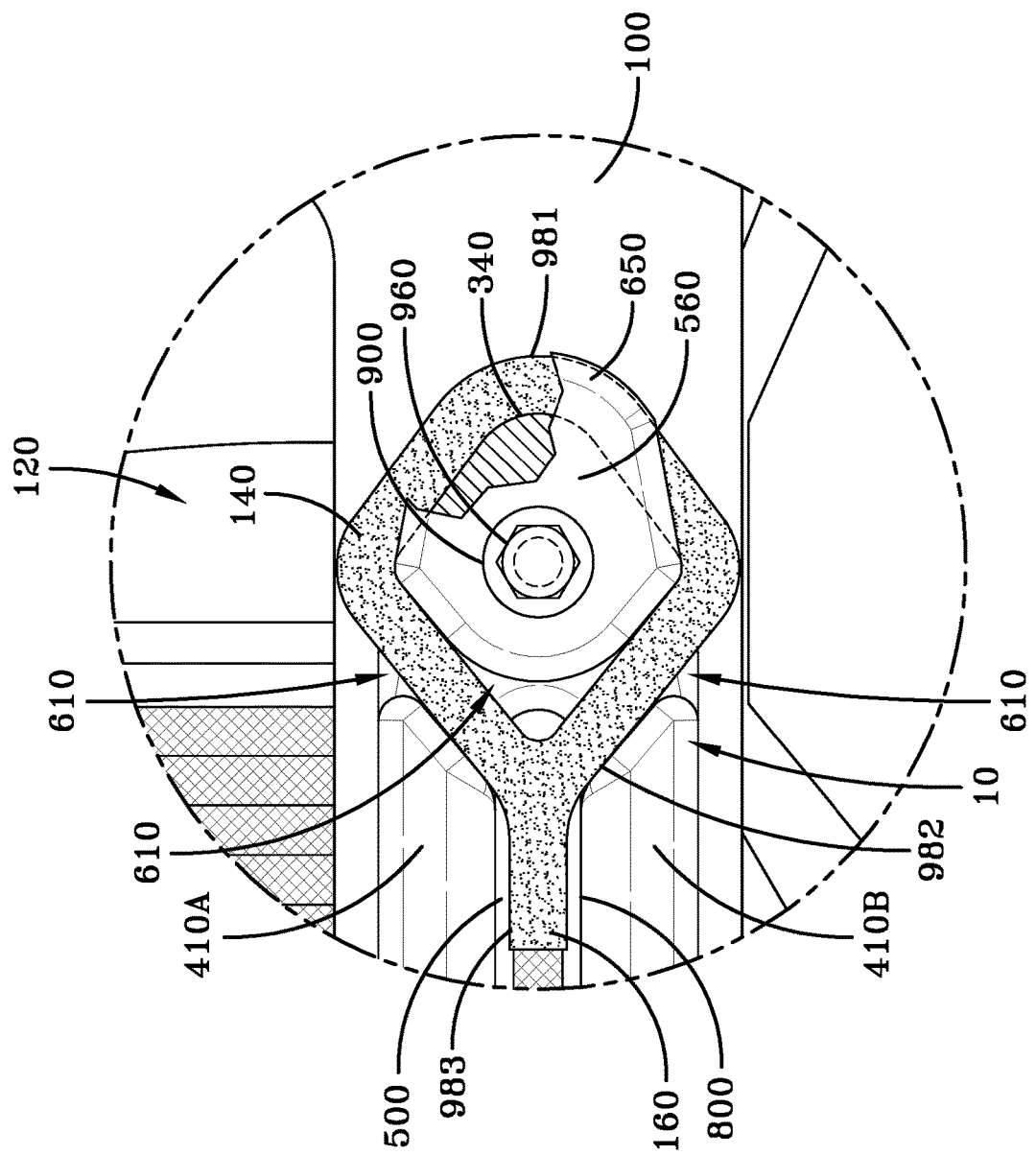
FIG. 2A is an inset elevational view showing the looped end of the winch line secured to one of the anchors provided by the fairlead in accordance with the concepts of the various embodiments disclosed herein.
Figure 17:
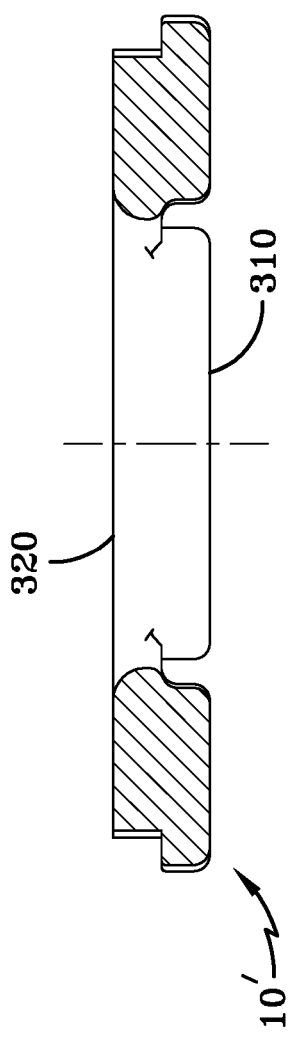
FIG. 17 is a cross-sectional view of the alternative fairlead in accordance with the concepts of the various embodiments disclosed herein.
Figure 18:
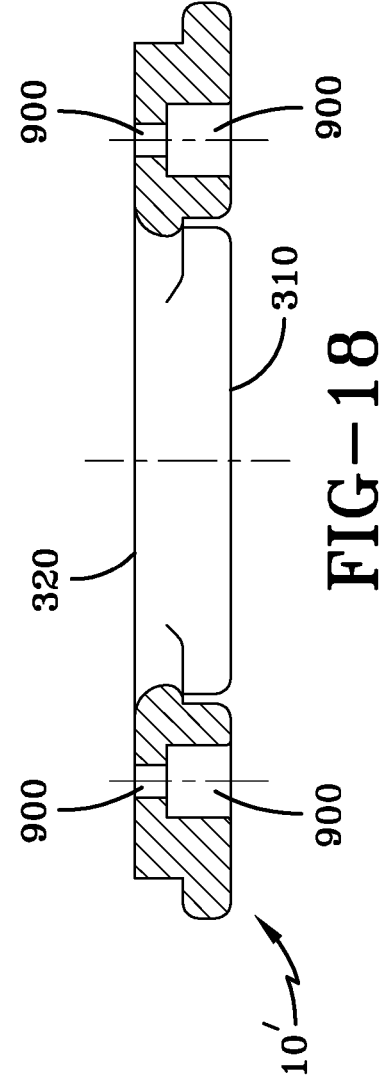
FIG. 18 is another cross-sectional view of the alternative fairlead in accordance with the concepts of the various embodiments disclosed herein.
Figure 19:
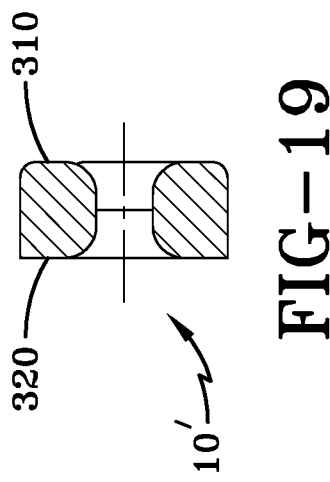
FIG. 19 is another cross-sectional view of the alternative fairlead in accordance with the concepts of the various embodiments disclosed herein.

A fairlead in accordance with the various embodiments disclosed herein is referred to by reference numeral 10, as shown in FIGS. 1-10. The fairlead 10 is attached to a bumper 100 of a vehicle 120, such as an off-road vehicle for example. It should be appreciated that the fairlead 10 may be used with any vehicle, including but not limited to, 4-wheel drive trucks, JEEP®, all-terrain vehicles (ATVs), utility terrain vehicles (UTV) and the like. The fairlead 10 is configured to secure and protect a free or looped end 140 of a winch line 160 that is attached at another end to a winch 180. To achieve this protection, the fairlead 10 includes one or more recessed cavities 500,600,610 that are configured to receive and protect a portion of the winch line 160, while one or more anchors 550,560 provided by the fairlead 10 are configured to retain the looped end 140 of the winch line 160. Accordingly, when the looped end 140 of the winch line 160 is attached to one of the anchors 550,560, the winch line 160 can be tightened by operation of the winch 180 to thereby secure the looped end 140 of the winch line 160 to the fairlead 10. As a result, the looped end 140 of the winch line 160 is protected by and secured to the fairlead 10, as shown in FIGS. 2-2A, so as to prevent damage to the winch line 160. In addition, because the winch line 160 is positioned within the recesses 500,600,610 and does not protrude beyond the fairlead 10, the approach angle of the vehicle 120 is not reduced, as is the case when a thimble, hook or shackle is used to secure the free or looped end 140 of the winch line 160, which is highly desirable.

Specifically, the fairlead 10, shown clearly in FIGS. 3-10, includes a body 300, which may be formed of any suitable material, such as a metallic material, polymeric material or a composite material. In some embodiments, the body 300 may be formed from aluminum, steel or composites and alloys thereof. The body 300 includes an outer face 310 and an opposed inner face 320 that is bounded by opposed longitudinal edges 330 and opposed lateral anchor edges 340. It should be appreciated that the opposed longitudinal edges 330 may be configured to be parallel with each other; however, they may be oriented at any desired angle to each other. In addition, the lateral anchor edges 340 may be arcuate. However, it should be appreciated that the opposed longitudinal edges 330 and the opposed lateral anchor edges 340 may be configured to have any desired shape, including a rectilinear shape, a curvilinear shape or a combination thereof. As shown in the Figs., the longitudinal edges 330 are configured to be substantially planar, while the lateral anchor edges 340 are configured to be substantially curved; however, other configurations are contemplated.

The outer face 310 includes a base surface 400 from which extends a pair of guide members 410A and 410B that are spaced apart. It should be appreciated that while two guide members 410A-B are shown, only one guide member may be used. Furthermore, one or more of the guide members 410A-B may be configured from a plurality of separate sections. Continuing, it should be appreciated that because the guide members 410A-B are structurally equivalent, for the purposes of brevity, only guide member 410A will be described in detail below. In some embodiments, the guide member 410A may be elongated in dimension; however, it may be of any suitable dimension. The guide member 410A includes opposed outer and inner edges 440 and 450 that define the longitudinal extent of the guide member 410A. It should be appreciated that the inner edge 450 may be configured to be substantially planar, but may be any suitable shape; that is the inner edge 450 may be curvilinear, rectilinear or a combination thereof. The guide member 410A also includes lateral edges 470 and 480, which may be tapered or curved. That is, the lateral edges 470 and 480 of the guide member 410A may be curvilinear, rectilinear or a combination thereof.

The guide members 410A and 410B are positioned such that their inner edges 450 are spaced apart to define a recessed main guide gap or cavity 500 therebetween. It should be appreciated that in some embodiments, the inner edges 450 of the guide members 410A and 410B are substantially parallel to each other, but such a configuration is not required. As such, it should be appreciated that the recessed main guide gap or cavity 500 may be any desired shape.

Spaced anchors or anchor members 550 and 560 extend from the base surface 400 of the outer face 310 and are positioned at the lateral ends of the fairlead 10. The anchors 550 and 560 each have an inner edge 580 that is proximate to and spaced from the lateral edges 470 and 480 of each of the guide members 410A and 410B. As such, the spacing between the inner edge 580 of the anchor 550 and the lateral edges 470 of the guide members 410A-B forms a recessed end gap or cavity 600 therebetween, while the spacing of the anchor 560 and the lateral edges 480 of the guide members 410A-B forms a recessed end gap or cavity 610 therebetween. It should be appreciated that the end gaps or cavities 600 and 610 are shown as being arcuate or curved; however, they may be of any suitable shape, including a rectilinear shape, a curvilinear shape or a combination thereof. The anchors 550 and 560 each include a flange member 650 that extends beyond the lateral anchor edges 340 of the body 300. It should be appreciated that the lateral anchor edge 340 may be curved, but may be configured to have any suitable shape, including a curvilinear shape, a rectilinear shape or a combination thereof. As such, it should be appreciated that because the flange member 650 of the anchors 550,560 extend beyond the lateral anchor edge 340 of the body 300 of the fairlead 10, an anchor region 700 is formed by the flange member 650 and the lateral anchor edge 340. It should be appreciated that the anchor region 700 is configured to retain the looped end 140 of the winch line 160, while the recessed end cavities 600 and 610 and the main guide cavity 500 are configured to allow the winch line 160 to be positioned in a recessed manner within the cavities 500, 600, 610 so that the winch line 160 does not protrude past the outer face 310 of the fairlead 10.

It should be appreciated that the main cavity 500 and the end cavities 600 and 610 are in open communication with each other and form a continuous recessed channel or groove.

It should also be appreciated that in some embodiments, only one anchor 550,560 is used by the fairlead 10.

Disposed so as to extend through the outer and inner faces 310 and 320 of the body 300 of the fairlead 10 is a guide aperture 800. The guide aperture 800 may be configured to have an elongated orientation but is not required. In some embodiments, the guide aperture 800 may be annular or oval-shaped for example. However, the guide aperture 800 may include an elongated opening defined by spaced longitudinal edges 810 terminated by curved ends 820, as shown in the Figs. In some embodiments, these longitudinal edges 810 may be substantially parallel to each other. However, they may be arranged in any suitable configuration. In addition, the guide aperture 800 may have any suitable dimension.

In some embodiments, a base surface 850 provided by the inner face 320 of the fairlead 10 may include a tapered or beveled surface 860 positioned proximate or adjacent to the guide aperture 800, as shown in the Figs. However, such a configuration is not required, and as such, the region proximate or adjacent to the guide aperture 800 may have any shape or contour. Similarly, the outer face 310 of the fairlead 10 may include a tapered or beveled surface 870 positioned proximate or adjacent to the guide aperture 800, as shown in the Figs. However, such a configuration is not required, and as such, the region proximate or adjacent to the guide aperture 800 may have any suitable shape or contour. It should be appreciated that the guide aperture 800 may be positioned so that it communicates with the gap 500. For example, in some embodiments the guide aperture 800 may be positioned between the guide members 410A and 410B. However, in other embodiments, the longitudinal edges 810 of the guide aperture 800 may be defined by the inner edges 450 of the guide members 410A and 410B. Furthermore, the guide aperture 800 may be configured to be the same length or, alternatively, may be shorter or longer than the length of one or more of the guide members 410A,410B.

It should be appreciated that in some embodiments, only one guide member 410A or 410b may be used by the fairlead 10.

Figure 22:
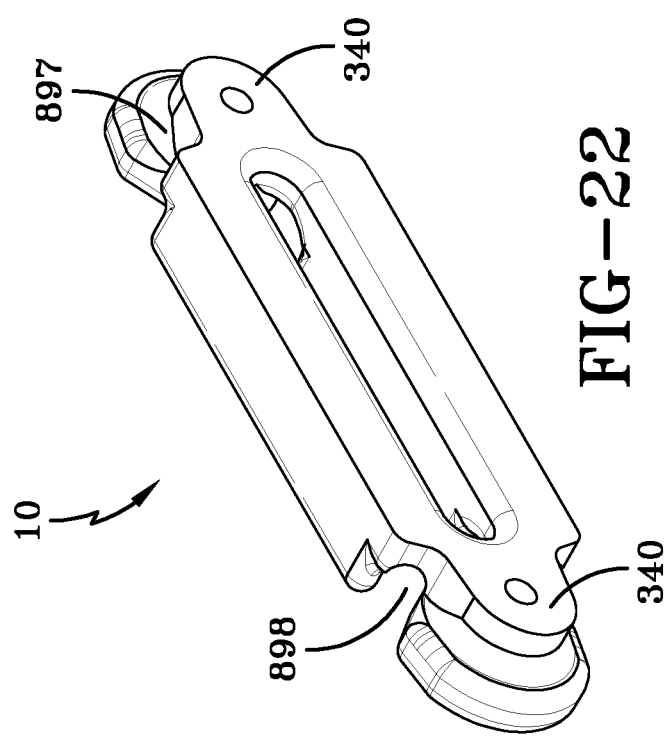
FIG. 22 is still another view of the alternative fairlead in accordance with the concepts of the various embodiments disclosed herein.

It should be appreciated that in another embodiment, the fairlead 10 (as well as fairlead 10' not shown) may be configured to include recessed shoulder cavities 897 and 898 that are disposed in the top and bottom portion of the anchors 550,560, as shown in FIGS. 20-22. Specifically, the recessed shoulder cavities 897 and 898 extend behind the flange members 650 of the anchors 550,560 and into the lateral anchor edges 340 of the fairlead body. As such, the recessed shoulder cavities 897 and 898 are in communication with the end recesses 600 and 610, and thereby function to extend the end cavities 600 and 610 into the lateral anchor edges 340 of the anchors 550,560. As a result, the recessed shoulder cavities 897,898 allow the looped end 140 of the winch line 160 to be retained deeper into the fairlead for enhanced environmental protection as compared to the fairlead 10 configuration that is shown in FIG. 2A that does not include the shoulder cavities 897 and 898.

Extending through the body of the fairlead 10 are one or more mounting apertures 900. In some embodiments, the mounting apertures 900 may be positioned so that they extend through the anchor members 550 and 560. However, the mounting apertures 900 may be disposed at any desired position on the body 300 of the fairlead 10. It should also be appreciated that the mounting apertures 900 may have one or more diameter dimensions. For example, in some embodiments the mounting apertures 900 may include a bore that extends through the body 300 at a first diameter dimension and then extends through the body 300 at one or more other different diameter dimensions.

It should be appreciated that in some embodiments the axial centers of the mounting apertures 900 are in vertical alignment with the axial center of the guide aperture 800, as shown in FIGS. 1-10.

It should also be appreciated that in some embodiments only one mounting aperture 900 may be used by the fairlead 10.

In some embodiments, one of the mounting apertures 900 may be replaced by a pin configured for receipt within a counterpart bore disposed in the body of the vehicle 120, while another fastener, such as a threaded screw, may be provided to receipt in the remaining mounting aperture 900.

The mounting apertures 900 allow a fastener, such as threaded screw, rivet or other fastening device to be used to attach the fairlead 10 to the vehicle 120, such as to its bumper 100 or other suitable structural component thereof. In some embodiments, the fairlead 10 may be attached using any suitable fastener, without the need or use of the mounting apertures 900. For example, the fairlead may be attached to the vehicle using adhesive, as well as snap or compression fit techniques.

It should be appreciated that the fairlead 10 is configured to be used with any suitable winch line 160 formed of any suitable material. For example, the winch line may be formed of high modulus polyurethane (HMPE), metallic material, such as steel, as well as synthetic material and the like.

Another embodiment of the fairlead is referred to by numeral 10' as shown in FIGS. 11-19. Specifically, the fairlead 10' is configured in a manner similar to that of the fairlead that was previously discussed, with the exception that the axial center of the guide aperture 800 is positioned so that it is vertically offset from the axial centers of the mounting apertures 900, as shown in FIGS. 11-19.

In order to place the fairlead 10,10' into operation, the fairlead 10,10' is positioned so that the inner face 320 of the fairlead is proximate or adjacent to the vehicle 120. As shown in FIGS. 1-2A, the fairlead 10,10' is attached to the vehicle 120 by placing the suitable fasteners, such as a threaded screw 960, through the mounting apertures 900 for threaded attachment to the bumper 100 or other frame member provided by the vehicle 120. It should be appreciated that in some embodiments the fairlead 10,10' may be mounted directly to the winch 180 in some cases.

Next, the free end of the winch line 160 that includes the looped end 140 is routed through the guide aperture 800. In order to prevent the looped end 140 of the winch line 160 from freely moving about and dragging on the ground, causing it to become damaged, the looped end 140 is attached one of the anchors 550 or 560 provided by the fairlead 10,10'. As shown in FIG. 2A, the looped end 140 of the winch line 160 is attached to the anchor 560. As such, the looped end 140 of the winch line 160 is positioned so that an apex portion 981 of the looped end 140 is located in the anchor region 700 so that it is positioned behind the flange 650 and positioned against the lateral anchor edge 340, while a collar or bottom portion 982 of the looped end 140 is positioned within the recessed end cavity 610. In addition, a portion 983 of the winch line 160 that is attached to the collar or bottom portion 982 of the looped end 140 of the winch line 160 is disposed within the main guide recess or cavity 500.

Continuing, the winch 180 is then actuated to pull the winch line 160 taut against the anchor edge 340 of the anchor 560 to which the looped end 140 of the winch line 180 is attached. As a result of the use of the fairlead 10,10', the winch line 160 and its looped end 140 is positioned within the recesses 500 and 610 provided by the fairlead 10,10', while the looped end 140 of the winch line 160 is also simultaneously disposed around the anchor 560. Such a configuration provided by the fairlead 10,10' serves to secure and protect the winch line 160 from damage, without reducing the approach angle of the vehicle. That is, the fairlead 10 allows the winch line 160 to be suitably recessed within the cavities 500,600,610 so that it is not exposed to environmental hazards were it can become damaged.

It should be appreciated, that the winch line 160 can be secured to the anchor 550 of the fairlead 10,10' in a similar manner to that discussed above in connection with anchor 560.

Thus, one advantage of the various embodiments disclosed herein is that a fairlead provides a recessed channel to conveniently store and protect the free end of a winch line from becoming frayed or otherwise damaged when the winch line is not in use on a vehicle. Another advantage of the various embodiments disclosed herein is that a fairlead protects the free end of a winch line without reducing the approach angle of a vehicle. Yet another advantage of the various embodiments disclosed herein is that a fairlead provides a user-friendly manner for securing and releasing a winch line to a fairlead. Still another advantage of the various embodiments disclosed herein is that a fairlead protects the portion of the winch line seated in the cavities of the fairlead from abrasion in every direction, including the top, bottom and sides.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:
1. A fairlead comprising:
a body;
a guide aperture disposed through said body adapted to receive a winch line therethrough;

at least one mounting aperture disposed through said body;
a main cavity disposed in said body and in communication with at least a portion of said guide aperture, said main cavity adapted to receive at least a portion of the winch line therein; and
an anchor member provided by said body, wherein said anchor member at least partially defines a first portion of said main cavity, and wherein said anchor member is configured to be received through a loop provided by the winch line or through a loop provided by a soft shackle attached to the winch line.

2. The fairlead of claim 1, wherein said anchor member includes a flange.

3. The fairlead of claim 2, further comprising an anchor cavity disposed in said anchor member adjacent to said flange.

4. The fairlead of claim 1, wherein said at least one mounting aperture comprises at least two mounting apertures.

5. The fairlead of claim 4, wherein said guide aperture is in vertical alignment with said mounting apertures.

6. The fairlead of claim 4, wherein said guide aperture is vertically offset from said mounting apertures.

7. The fairlead of claim 1, wherein said guide aperture is elongated.

8. The fairlead of claim 1, wherein a surface of one or more guide members proximate to said guide aperture is curved.

9. A fairlead comprising:
a body;
a guide aperture disposed through said body;
at least one mounting aperture disposed through said body;
a main cavity disposed in said body and in communication with at least a portion of said guide aperture,
an anchor member provided by said body, wherein said anchor member at least partially defines a first portion of said main body,
a first guide member provided by said body and positioned proximate to said main cavity; and
a second guide member provided by said body and positioned proximate to said main cavity,
wherein said first guide member includes an edge that is spaced from said anchor member to at least partially define said first portion of said main cavity.

10. The fairlead of claim 9, wherein said first and second guide members are spaced apart and at least partially define a second portion of said main cavity.

11. The fairlead of claim 9, wherein said edge of said first guide member is tapered or curved.

12. The fairlead of claim 11, wherein said anchor member includes a curved edge positioned proximate to said first portion of said main cavity.

13. The fairlead of claim 9, wherein said second guide member includes an edge that is spaced from said anchor member to at least partially define said first portion of said main cavity.

14. A fairlead comprising:
a body;
a guide aperture disposed through said body;
at least one mounting aperture disposed through said body;
a main cavity disposed in said body and in communication with at least a portion of said guide aperture, and
an anchor member provided by said body, wherein said anchor member at least partially defines a first portion of said main body,
wherein said at least one mounting aperture is disposed through said anchor member.

15. A fairlead for a vehicle carrying a winch line having a looped end, the fairlead comprising:
a body having a first surface and a second surface, said second surface adapted to be positioned proximate to the vehicle;
a guide aperture disposed through said body adapted to receive the winch line therethrough;
at least one mounting aperture disposed through said body; and
a cavity disposed in said first surface of said body and in communication with at least a portion of said guide aperture, said cavity adapted to receive at least a portion of the winch line therein;
a first guide member extending from said first surface and positioned proximate to said guide aperture;
a second guide member extending from said first surface and positioned proximate to said guide aperture;
wherein said first and second guide members are spaced apart and define at least a first portion of said cavity;
an anchor member extending from said first surface of said body;
wherein said anchor member at least partially defines at least a second portion of said cavity, said anchor member being configured to be received through the looped end of the winch line.

16. A fairlead comprising:
a body;
a guide aperture disposed through said body;
at least one mounting aperture disposed through said body;
a main cavity disposed in said body and in communication with at least a portion of said guide aperture,
an anchor member provided by said body, wherein said anchor member at least partially defines a first portion of said main body,
wherein said anchor member includes a flange, and
wherein said first portion of said main cavity extends behind said flange.

17. A fairlead comprising:
a body;
a guide aperture disposed through said body;
at least one mounting aperture disposed through said body;
one or more anchor members provided by said body, wherein each said anchor member is configured to be received through a loop in a winch line or through a loop of a soft shackle attached to the winch line.

18. The fairlead of claim 17, wherein said one or more anchor members includes a flange.

19. The fairlead of claim 17, further comprising a cavity that extends between said body and said one or more anchor members.

* * * * *